United States Patent [19]
Labarre et al.

[11] Patent Number: 5,592,743
[45] Date of Patent: Jan. 14, 1997

[54] SHOCK ABSORBER FOR SCISSOR ACTION TOOL

[75] Inventors: Ernest D. Labarre, Waunakee; Jerrold N. Austin, Baraboo, both of Wis.

[73] Assignee: Fiskars Inc., Madison, Wis.

[21] Appl. No.: 208,127

[22] Filed: Mar. 9, 1994

[51] Int. Cl.⁶ .................................................. B26B 13/16
[52] U.S. Cl. ................................ 30/271; 30/254; 30/261; 16/86 B
[58] Field of Search ........................... 30/261, 262, 234, 30/191, 193, 254, 271, 266, 268; 16/86 A, 86 B, 86 R

[56] References Cited

U.S. PATENT DOCUMENTS

| | | | |
|---|---|---|---|
| 382,034 | 5/1888 | Dutcher | 30/193 |
| 547,101 | 10/1895 | Williams . | |
| 814,799 | 3/1906 | Petty | 30/261 |
| 841,458 | 1/1907 | Scott | 30/271 |
| 1,822,591 | 9/1931 | Hickok . | |
| 2,105,332 | 1/1938 | Rauh . | |
| 2,373,757 | 4/1945 | Hart | 30/271 |
| 2,727,304 | 12/1955 | Kulbersh . | |
| 4,073,059 | 2/1978 | Wallace et al. . | |
| 4,156,311 | 5/1979 | Wallace et al. . | |
| 4,567,656 | 2/1986 | Wallace et al. | 30/262 |

FOREIGN PATENT DOCUMENTS

| | | | |
|---|---|---|---|
| 2208596 | 6/1974 | France . | |
| 165398 | 1/1905 | Germany | 30/271 |
| 3610828 | 10/1987 | Germany | 16/86 B |

OTHER PUBLICATIONS

Wallace® 1994 Lawn & Garden Products catalog, A Fiskars Company, p. 6, 1994.

*Primary Examiner*—Rinaldi I. Rada
*Assistant Examiner*—Boyer Ashley
*Attorney, Agent, or Firm*—Foley & Lardner

[57] ABSTRACT

The present invention relates to scissor action tools such as garden shears or the like which are provided with a pair of cooperatively engaging members united for scissor action about a joint. In particular, this invention relates to tools of the type provided with a shock absorber for absorbing the impact created upon complete closure of the tool. The shock absorber includes a shank secured to one of the members. The shank is configured to merge into a resilient head which is formed as an annular structure. The head comes into abutting relationship with the other member when the members assume a closed position.

16 Claims, 1 Drawing Sheet

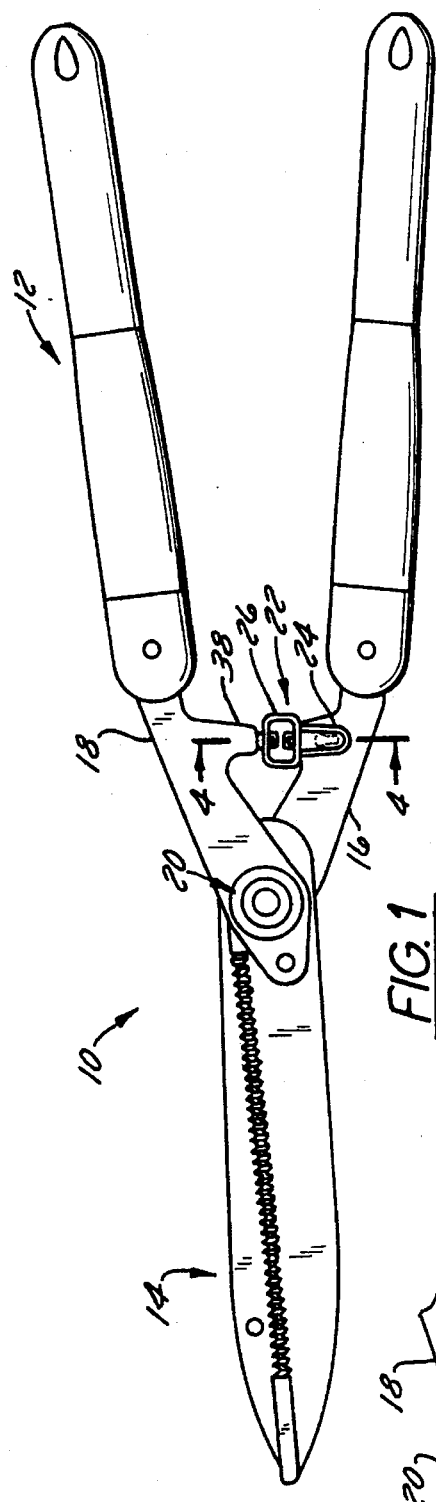
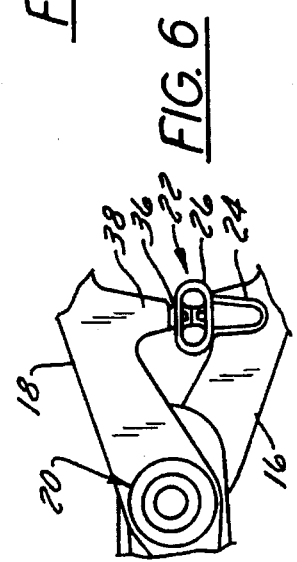
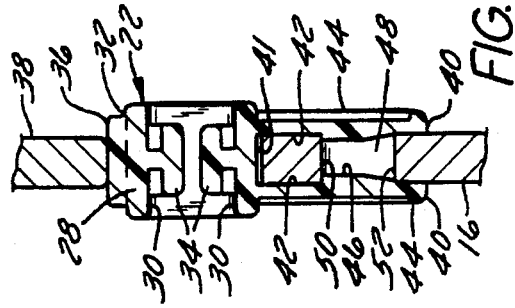
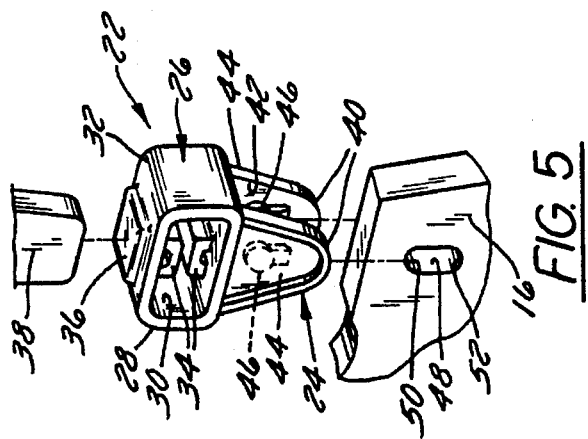

SHOCK ABSORBER FOR SCISSOR ACTION TOOL

FIELD OF THE INVENTION

This invention relates, generally, to scissor action tools such as garden shears or pruners and the like, having a pair of cooperatively engaging elongated members united for scissor action about a joint. In particular, this invention relates to scissor action tools having an improved shock absorbing stop, preferably one having simple construction. Although it will become apparent from the following description that certain features of the present invention may be utilized in tools of various designs for application to specific uses, for ease of understanding and convenience, the following description will from time to time specifically refer to a hedge shears as the most preferred implementation of the present invention.

BACKGROUND OF THE INVENTION

It is generally known to provide scissor action tools, such as hedge shears, with a mechanism for absorbing the shock created by the impact of the tool handles upon completion of the scissor action, i.e., upon complete closure of the tool. Such a feature is particularly useful in hedge shears in light of the fact that a user typically tends to apply uniform scissor action to the tool even though the force required to trim hedges, limbs, etc., may vary depending upon the resistance presented by the growth. A shock absorbing feature therefore renders the use of the hedge shears more comfortable, reducing jarring and forearm fatigue.

Shock absorbing features presently provided on such cutting implements typically include spring biased mechanisms. Examples of such mechanisms are described in U.S. Pat. No. 2,727,304, issued Dec. 20, 1955 to Kulbersh; U.S. Pat. No. 1,822,591, issued Sep. 8, 1931 to Hickok; and U.S. Pat. No. 547,101, issued Oct. 1, 1895 to Williams. As more particularly disclosed in these patents, the shock absorbing feature comprises a spring biased plunger received in a cavity secured to one of the elongated members, while the other elongated member is provided with an abutting surface engageable with the plunger upon closure of the members.

Other ways to eliminate those objectionable impact shocks are disclosed in U.S. Pat. No. 2,105,332, issued Jan. 11, 1938 to Rauh and in U.S. Pat. Nos. 4,073,059, and 4,156,311, issued Feb. 14, 1978, and May 29, 1979, respectively, both to Wallace et al. Rauh discloses a shock absorber for garden shears comprising a pair of substantially U-shaped sheet metal shields configured to receive elongated blocks of rubber which are substantially enclosed within the shields. A pair of elongated holes is formed in the shield to permit lateral displacement of the shields when the rubber is fully compressed upon complete closure of the handles. The Wallace patents disclose the use of a power element or bumper in connection with a hand tool having a channel-shaped upper handle. The bumper, which is received within a pair of upstanding side walls, is formed of rubber or similar elastomeric material which will deform under the impact of the handles.

The present inventors have found, however, that shock absorbing mechanisms of the kind described in these prior art patents have various limitations. For example, and as also illustrated in the Wallace® 1994 Catalog at page 6, these mechanisms typically consist of a number of components which may require separate subassembly operations and can therefore be more costly to manufacture. In addition, the metal components of certain prior art mechanisms may rust if used in a humid environment, and for those using a rubber-like shock absorbing material, such material may become brittle with time. Accordingly, those prior art shock absorbing stops in addition to potentially being more costly to manufacture may also be less durable than simpler structures, thereby limiting the life expectancy of the tool or restricting desirable uses of the tool. Furthermore, elastomeric shock absorbers of the type disclosed in Rauh and the two Wallace patents suffer from the fact that to attempt to control the shock absorbing function, guiding plates or walls are required.

Thus, there continues to exist a need for an inexpensive shock absorbing mechanism or "bumper" for items such as hedge shears or the like which can alleviate the problems associated with conventional shock absorbing mechanisms, i.e., which is of simpler construction while permitting a certain amount of control over the performance of the bumper, which is of improved durability, and which facilitates assembly to the tool or replacement during the life of the hedge shears.

SUMMARY OF THE INVENTION

The present invention provides an inexpensive shock absorbing mechanism for tools having a pair of elongated members united for scissor movement about a joint. The tool or implement has a shock absorbing stop disposed rearwardly of the joint and between the members. The shock absorber comprises a shank adapted to be secured to one of the members. The shank merges into a resilient head coming into abutting relationship with the other member when the members assume a fully closed position, thereby absorbing the impact created by complete closure of the members. This approach simplifies manufacturing and assembly operations thereby reducing costs, and improves, or at least does not deteriorate, the operation of the tool.

According to a preferred embodiment of the present invention, in a hedge shears having two cooperating pivoted members, a shock absorbing stop disposed rearwardly of the pivot comprises a shank configured to be removably secured to one of the members. The shank merges into a head having an annular structure and a pair of mutually opposed projections extending from the inner surface of the annular structure, the projections being configured to limit the amount of flexing of the annular structure upon complete closure of the members.

Other advantages of the present invention will become apparent from the detailed description given hereinafter. It should be understood, however, that the detailed description of specific embodiments is given by way of illustration only since, from this detailed description, various changes and modifications within the spirit and scope of the invention will also become apparent to those skilled in the art.

BRIEF DESCRIPTION OF THE DRAWINGS

The preferred exemplary embodiment of the present invention will hereinafter be described in conjunction with the appended drawings, wherein like numerals denote like elements, and:

FIG. 1 is a top elevational view of a hedge shears showing the shock absorber of the present invention;

FIG. 2 is a front elevational view of the shock absorber of the present invention;

FIG. 3 is a front elevational view in partial section of the shock absorber of FIG. 2;

FIG. 4 is a fragmentary cross-sectional view taken along line 4—4 shown in FIG. 1;

FIG. 5, is an exploded view of the shock absorber of the present invention installed on the hedge shears of FIG. 1; and FIG. 6 is a fragmentary elevational view of the hedge shears of FIG. 1 showing the shock absorber in a position corresponding to complete closure of the hedge shears.

DETAILED DESCRIPTION OF A PREFERRED EXEMPLARY EMBODIMENT

Referring to the Figures, a hedge shears, generally designated as 10, is provided with a shock absorbing feature in accordance with the present invention. As is customary, shears 10 comprises a force applying end 12 and an opposed working end 14. Tool 10 is shown to include first and second elongated members 16, 18, respectively joined about a pivot point generally designated as 20. Tool 10 further comprises a shock absorbing stop, which will be interchangeably described in this application as a shock absorber or "bumper," generally designated as 22 which, as shown more particularly in FIGS. 1 and 6, is disposed rearwardly of pivot 20.

Bumper 22 comprises a shank 24 merging into a resilient head 26. As shown in FIG. 1, head 26 comes into abutting relationship with elongated member 18 when members 16 and 18 assume a closed position, i.e., upon complete closure of tool 10. To suitably perform the shock absorbing function, head 26 is preferably made of a thermoplastic material such as an Acetal resin, which is relatively inexpensive. However, to facilitate manufacturing, shock absorber 22 (i.e., head 26 and shank 24) may be made of thermoplastic material, thereby permitting shock absorber 22 to be manufactured easily and economically in a simple injection molded operation.

Those skilled in the art will nonetheless appreciate that shock absorber 22 need not be formed in its entirety of resilient material since, as noted earlier, the shock absorbing function is primarily performed by resilient head 26. Accordingly, shank 24 can be formed of other material suitable to be joined by commonly known techniques to head 26. Thus, while the term "merging" is used to refer to the joining of head 26 to shank 24, the use of those other techniques to join shank 24 to resilient head 26, although found less desirable by the present inventors, do not depart from the scope of the present invention.

As more particularly shown in FIGS. 2 through 4, head 26 is preferably formed of an annular structure 28 having spaced inner and outer surfaces 30, 32, respectively. Head 26 also comprises a pair of mutually opposed projections 34 extending along the longitudinal axis 21 of bumper 22 (an axis shown vertically in FIG. 2), inwardly from inner surface 30. As more particularly shown in FIG. 6, projections 34 are configured to come into abutting relationship to limit the amount of flexing of annular structure 28 upon complete closure of members 16, 18.

Although some prior art shock absorbers use certain thermoset-type materials such as rubber, those skilled in the art will readily appreciate the limitations which accompany the use of such materials. In particular, in a shock absorbing stop using a material such as rubber, when it is desired to control the deformation of the thermoset material, guiding plates, shield, etc., will typically be required. On the other hand, shock absorbing stops, in accordance with the present invention, made of thermoplastic, or of a material having similar structural properties, retain sufficient structural integrity under compressive forces imparted to bumper 22 during closure of tool 10, thereby eliminating the need for those guiding structures. Thus, the thermoplastic material preferred by the present inventors facilitates molding head 26 into a structure of defined contour, such as annular structure 28, economically providing the desired shock absorbing function, and permits a certain amount of control of the amount of flexing of the structure.

Head 26 advantageously comprises a projection 36 extending outwardly along the longitudinal axis of bumper 22. Projection 36 is designed to come into engagement with member 18 upon closure of tool 10. Although as shown in FIGS. 1, 4, and 5, projection 36 is advantageously configured as a pad extending over a region of outer surface 32 to engage a projection 38 formed in member 18, it should be recognized that depending on the particular configuration of member 18 or projection 38, projection 36 could conversely consist of a recessed area suitably formed in outer surface 32 to abut with a projection on member 18 having another configuration.

As we have seen earlier, bumper 22 comprises a shank 24 which is joined to a head 26. To facilitate installation and removal of bumper 22, shank 24 comprises a pair of spaced legs 40 projecting from head 26 by a predetermined distance. As more particularly shown in FIG. 4, legs 40 are substantially parallel to the longitudinal axis of bumper 22 and are separated by bottom region 41 which is the portion of outer surface 32 located between legs 40. Legs 40 have oppositely facing inner and outer faces 42, 44, respectively, and projections, ears, or tabs, 46 projecting from inner surface 42 to be received in an aperture 48 formed in elongated member 16. Because it is preferably made from resilient thermoplastic material, bumper 22 can be conveniently removed from elongated member 16 by prying legs 40 sufficiently away from elongated member 16 to permit tabs 46 to escape aperture 48.

When a compressive force resulting from the closure of tool 10 is applied to bumper 22, bumper 22 is first displaced in the direction of the scissor action until bottom region 41 rests on member 16. To avoid damaging projections 46 upon closure of tool 10, aperture 48 is preferably formed as an elongated hole having an inner terminus 50 and an opposed outer terminus 52. Aperture 48 is dimensioned so that, upon closure of tool 10, region 41 rests on member 16 before projections 46 engage outer terminus 52. This prevents shearing projections 46 under the compressive force applied to tool 10. To absorb the additional displacement resulting from the closure of tool 10, annular structure 28 flexes until, if necessary, projections 34 come into abutting relationship.

It should be understood that the above description is of a preferred exemplary embodiment of the present invention and that the invention is not limited to the specific forms described herein. For example, this invention could also be used with tools other than hedge shears which require a certain amount of scissor action to perform a cutting or other operation. In addition, although the embodiment shown in the figures is the most preferred embodiment, it should be noted that this invention, which is based on a resilient shock absorbing stop, can be carried out in other manners. For example, annular structure 28 could take other configurations so long as those other configurations possess shock absorbing properties. In addition, projections 34 need not be of identical configuration but may be shaped in other ways to limit the amount of flexing of resilient head 26. Moreover, shank 24 can be removably secured to member 16 by other means. For example, member 16 can be provided with a projection removably received in a recess formed in inner face 42. However, such other constructions and features are considered to be broadly within the ambit of this invention. Thus, these and other substitutions, modifications, changes and omissions may be made in the design and arrangement of the elements disclosed herein without departing from the scope of the appended claims.

What is claimed is:

1. A bumper for absorbing the impact created by complete closure of a pair of cooperatively-engaging elongated members united for scissor action about a joint, the bumper having a longitudinal axis and comprising a shank configured to be removably secured to one of the members, the shank merging into a resilient head coming into abutting relationship with the other of the members when the members assume a closed position, the head being formed as an annular structure having spaced inner and outer surfaces, the shank comprising a pair of spaced legs projecting from the head by a predetermined distance in a direction substantially parallel to the axis, the legs having respective inner and outer faces, the inner faces being configured to engage a first of the elongated members.

2. The bumper of claim 1 wherein the bumper is a single piece structure.

3. The bumper of claim 1 wherein the axis extends in a direction substantially perpendicular to the members.

4. The bumper of claim 1 wherein the bumper is made out of thermoplastic material.

5. The bumper of claim 4 wherein the bumper is made out of Acetal.

6. The bumper of claim 1 wherein the head is in the abutting relationship with the other of the members in a region of the outer surface proximate the axis and the shank merges into the head in a second region of the outer surface axially opposed to the region.

7. The bumper of claim 1 wherein the head further comprises a pair of mutually opposed projections extending along the axis inwardly from the inner surface, the projections being configured to come into abutting relationship to limit the amount of flexing of the annular structure upon complete closure of the members.

8. The bumper of claim 1 wherein the outer surface comprises a projection formed in a region of the outer surface proximate the axis.

9. The bumper of claim 8 wherein the projection extends outwardly from the outer surface.

10. The bumper of claim 1 wherein at least one of the legs further comprises a tab projecting from the inner face of the at least one of the legs, and wherein the first of the elongated members includes a recess configured to removably receive the tab.

11. A tool having first and second elongated members united for scissor action about a joint, the members having respective working pieces disposed forward of the joint for cooperative engagement, wherein the tool further comprises a shock absorber disposed rearwardly of the joint and between the members for absorbing the impact created by complete closure of the members, the shock absorber having a longitudinal axis and a shank adapted to be secured to the first member, the shank merging into a resilient head coming into abutting relationship with the second member when the members assume a closed position thereby absorbing the impact created by complete closure of the members, the head being formed as an annular structure having spaced inner and outer surfaces, the head being in the abutting relationship with the second member in a region of the outer surface adjoining the axis, and the shank merging into the head in a second region of the outer surface axially opposed to the region, the shank comprising a pair of spaced legs projecting from the head by a predetermined distance in a direction substantially parallel to the axis, the legs having respective inner and outer faces, the inner faces being configured to engage the first member.

12. The tool of claim 11 wherein the head further comprises a pair of mutually opposed projections extending along the axis inwardly from the inner surface, the projections being configured to come into abutting relationship to limit the amount of flexing of the annular structure upon complete closure of the members.

13. The tool of claim 11 wherein the outer surface comprises a projection formed in a region of the outer surface extending about the axis.

14. The tool of claim 11 wherein at least one of the legs further comprises a tab projecting from the inner face of the at least one of the legs, and wherein the first member includes an aperture configured to removably receive the tab.

15. A hand tool having a force applying end and an opposed working end lying across a joint through which a force may be transmitted, wherein the tool comprises:

first and second elongated members disposed for cooperative engagement about the joint; and a thermoplastic shock absorber disposed rearwardly of the joint and between the members for absorbing the impact created by complete closure of the members, the shock absorber having a longitudinal axis and a shank adapted to be secured to the first member, the shank merging into a head comprising a resilient annular structure having spaced inner and outer surfaces, the head being in an abutting relationship with the second member, upon the closure of the members, in a region of the outer surface adjoining the axis, and the shank merging into the head in a second region of the outer surface axially opposed to the region, the shank comprising a pair of spaced legs projecting from the head in a direction substantially parallel to the axis by a predetermined distance and configured to engage the first of the elongated members.

16. The tool of claim 15 wherein the head further comprises a pair of mutually opposed projections extending along the axis inwardly from the inner surface, the projections being configured to limit the amount of flexing of the annular structure upon closure of the members.

* * * * *